(No Model.)

W. WADE.
VALVE.

No. 345,197.    Patented July 6, 1886.

Witnesses
J. Paul Mayer
Sumner Collins

Inventor
William Wade
by Geo. H. Lothrop
atty.

UNITED STATES PATENT OFFICE.

WILLIAM WADE, OF TRENTON, MICHIGAN, ASSIGNOR OF TWO-THIRDS TO NATHAN NEFF, OF SAME PLACE, AND FREDERICK H. SEYMOUR, OF DETROIT, MICHIGAN.

VALVE.

SPECIFICATION forming part of Letters Patent No. 345,197, dated July 6, 1886.

Application filed November 23, 1885. Serial No. 183,770. (No model.)

*To all whom it may concern:*

Be it known that I, WILLIAM WADE, of Trenton, in the county of Wayne and State of Michigan, have invented a new and useful Improvement in Valves, of which the following is a specification.

My invention consists in a novel construction of valves of the class in which the valve is forced by a screw-threaded stem against a seat formed in a diaphragm extending across the shell of the valve, whereby the valve can be reseated or ground by the motion of the valve-stem, either through the agency of the valve itself or a burr attached to the stem, and by which an ordinary globe-valve is rendered capable of use as a check-valve, and as hereinafter fully set forth and pointed out.

Figure 1:
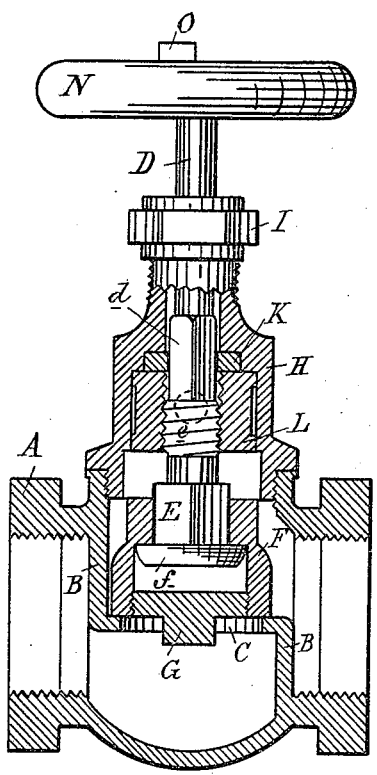
Figure 2:
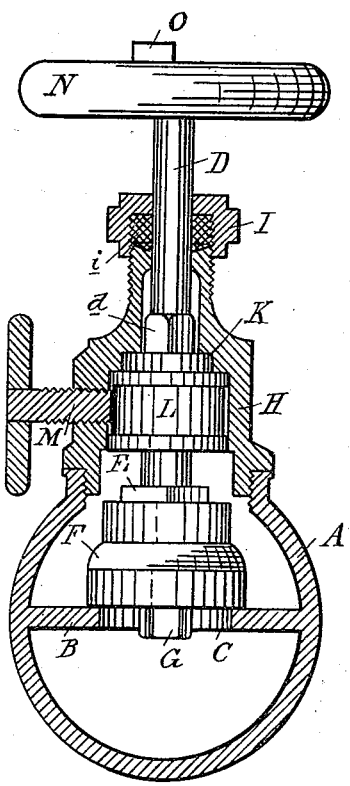

Figures 1 and 2 are vertical central sections at right angles to each other.

A represents the shell of a valve, in this case a globe-valve, and B represents a diaphragm extending across the shell, having a seat, C, formed thereon in the usual manner.

H represents a cage, which screws into the shell to contain the moving parts of the valve, in the usual manner, and carrying at its upper end the ordinary stuffing-box and packing I *i*.

D represents the valve-stem, N an ordinary hand-wheel to turn the stem, and O a nut or screw to fasten the wheel N to the stem. The upper portion of stem D is, as usual, round where it passes through the stuffing-box, and a screw-thread. *e*, is cut on the stem within the cage to reciprocate the stem when turned. Below the stuffing-box and above the screw-thread *e* a nut, K, encircles the stem and rests against the lower side of a shoulder formed in the cage H, as clearly shown in the drawings, and this nut, or rather collar, K is so connected with the stem that it must turn therewith, but must slide thereon. The construction shown to attain this result is to square a portion of the stem, as shown at *d*, and to square collar K to fit the stem; but this result may be attained in other common ways well known to mechanics.

L represents a nut adapted to engage with the thread *e* on stem D, and is made to fit loosely within the cage H, so that it can turn freely therein, and its upper surface is in contact, when in position, with the under surface of collar K, so that the rotation of collar K with stem D will rotate nut L by friction.

F represents the valve proper, and is so attached to the end of stem D that it must turn with said stem, but is capable of a reciprocating motion thereon to a limited extent. The method which I have illustrated to attain this result is to square the lower end of the stem, as shown at E, and finish it with a head, *f*, as shown in Fig. 1. The valve F is bored out from its lower end a short distance large enough to receive head *f*, and from this point to its upper end has a square hole therein to receive the part E of the valve-stem D, and the valve fits loosely on the stem.

G represents a screw-plug in the lower end of the valve, against which the head *f* comes when the stem D is screwed down to force the valve against its seat. It is evident that this construction permits the use of this valve as a check-valve, because, when the valve F is forced against its seat, screwing up the stem will not raise the valve until the head *f* comes against the shoulder in the valve, and the stem can be raised to this extent and leave the valve in position to operate as an ordinary check-valve.

M represents a set-screw tapped through the side of cage H, so that its end, when screwed in, will come in contact with the periphery of nut L, and hold said nut fast, so that it cannot rotate with the stem. When this set-screw M is turned in against the nut L, the rotation of the stem causes the stem to raise or lower the valve in the ordinary manner; but when the set-screw M is turned out, so that it does not hold the nut L, said nut L will rotate with the stem D without raising or lowering the valve F. Should the seat or valve become a little worn, so as to leak, or should the seat become coated with sediment, it can be cleaned or ground without removing any of the parts of the valve by simply turning the valve down on the seat, unscrewing set-screw M to free nut L, and then rotating the stem D, either by the wheel N or by attaching a brace or lever thereto, which will revolve the face of valve F on its seat until the seat is sufficiently ground or the sediment worn off. If the seat needs too much grinding to be readily done with the valve F, which is usually of soft metal, the cage H can be unscrewed, valve F taken off from the stem, a steel burr secured to the end of stem D, the cage H screwed in place, and the seat ground, as before. The seat can therefore be ground without the use of a special machine, and without the necessity of removing the valve from its position.

What I claim as my invention, and desire to secure by Letters Patent, is—

1. The combination, with the shell, seat, and cage of a valve, of a valve-stem having a screw-thread thereon, a rotatable nut applied to the threaded portion of the stem within the cage, and detachably secured to the shell against rotation, and a collar secured to the stem, to turn therewith and slide longitudinally thereon and bearing against said nut and an inner wall of the cage, substantially as described.

2. The combination of the cage H, spindle D, having the squared part $d$ and screw-thread $e$ thereon, collar K, fitted on the part $d$ of the stem, nut L, and set-screw M, substantially as shown and described.

3. The combination, with the valve-casing, of the valve-stem D, having the squared part E and head $f$, and the valve F, having therein the plug G, substantially as shown and described.

4. In a valve, the combination, with the valve-casing and a screw-threaded valve-stem, of a collar on and turning with said stem above the threaded portion of the stem and within the valve-casing, a rotatable nut fitted to the threaded portion of the stem and bearing against said collar, and a set-screw tapped through the valve-casing, to bear against the nut to lock it to the casing, substantially as described.

WILLIAM WADE.

Witnesses:
CHARLES H. CAMPBELL,
GEO. H. LOTHROP.